Oct. 19, 1971     E. W. WEBER     3,613,198
CUTTING TOOL ASSEMBLY
Filed Sept. 19, 1969
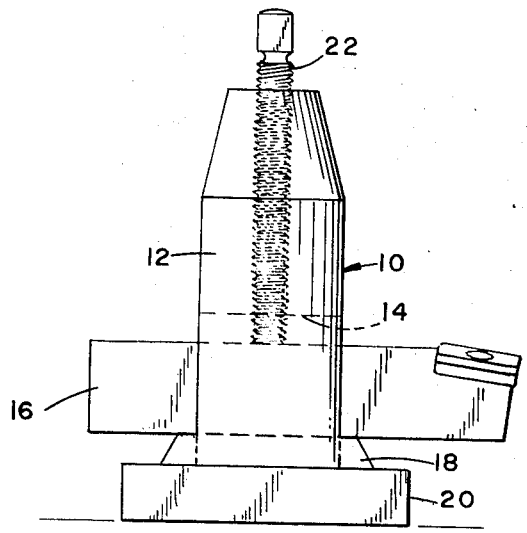
FIG. 1
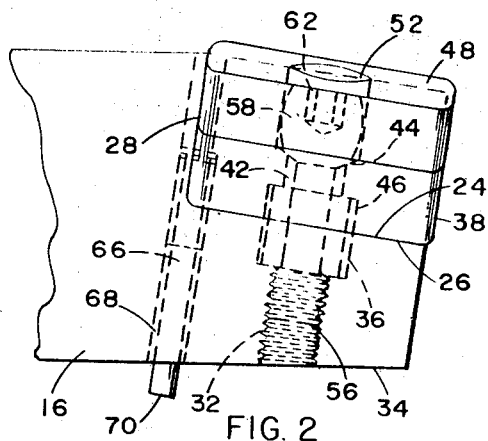
FIG. 2
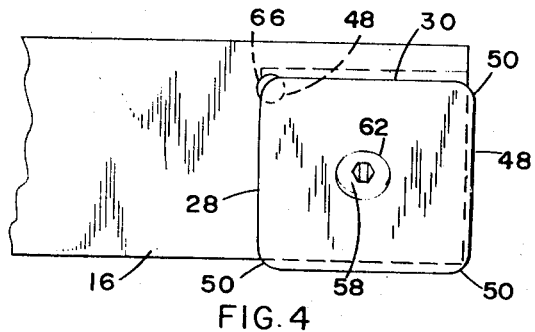
FIG. 4
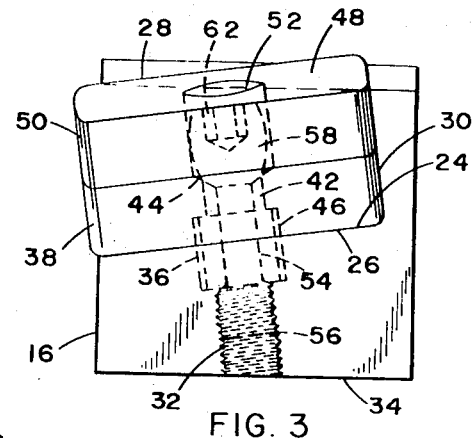
FIG. 3
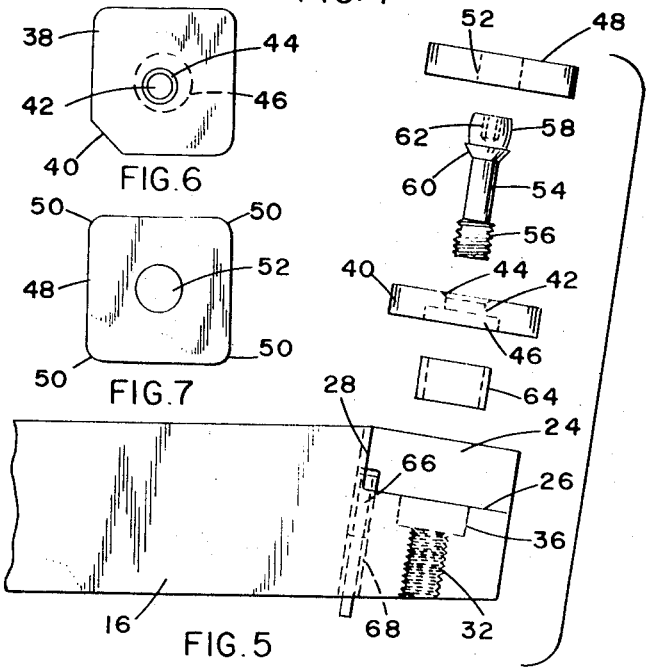
FIG. 6
FIG. 7
FIG. 5
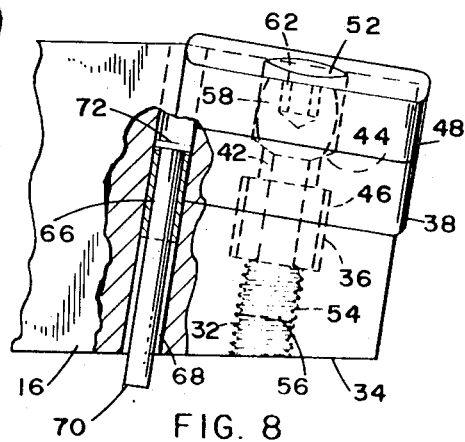
FIG. 8
INVENTORS
EMIL W. WEBER
BY    *(signature)*
ATTORNEY

United States Patent Office 3,613,198
Patented Oct. 19, 1971

3,613,198
CUTTING TOOL ASSEMBLY
Emil W. Weber, 924 Marbrook Lane,
York, Pa. 17404
Filed Sept. 19, 1969, Ser. No. 859,397
Int. Cl. B26d 1/00
U.S. Cl. 29—96
6 Claims

ABSTRACT OF THE DISCLOSURE

A cutting tool assembly comprising a tool shank having a recess in one end thereof defined by a base surface and at least one wall perpendicular thereto, a hole extending through said base surface, and a disposable cutting tool having an axial hole aligned with said hole in said shank. A seat member complementary in shape to said cutting tool also has an axial hole chamfered at one end and an annular bushing extends between and is received within complementary recesses in said base surface and seat member to secure the same against movement within planes parallel thereto. A locking pin threaded on one end is threaded into the hole in said base surface of said tool shank and the opposite end is received within the hole in said disposable cutting tool, while an intermediate portion is complementary to the chamfer of the hole in the seat member and is operable to wedge the cutting tool within said recess in said tool shank when the pin is threaded into the hole in the recess of the shank and also permit ready release of said cutting tool when a limited amount of unthreading movement of said locking pin occurs relative to the tool shank.

BACKGROUND OF THE INVENTION

The invention pertains to a cutting tool assembly and particularly one in which cutting edges or points thereon are quickly and selectively positionable upon a seat in a tool shank to position an unused cutting edge or corner in operative relationship after a previously used edge or point has become worn. Many types of means for clamping such as expendable or disposable cutting tool have been provided herebefore and particularly the well known type of providing a cross-member having one end which overlies and clamps the cutting tool or chip breaker thereon from above to secure the cutting tool against the supporting surface of a seat on the tool shank.

More recently, a type of disposable cutting tool of carbide nature which has become popular is one in which the same has a predetermined geometric shape in plan view and an axial hole in the center thereof to receive the upper end of the positioning and clamping or locking pin which is arranged to be urged in a direction transverse to the axis of the pin so as to clamp at least one edge of the cutting tool against a corresponding wall of the recess in the tool shank when the pin is threaded into a threaded portion of a hole in the tool shank.

Prior examples of the previous and current types of tools referred to above are shown in the following patents: Nos. 2,598,581, McKenna et al., May 27, 1952; 3,320,654, Lovendahl, May 23, 1967; 3,341,920, Kelm, Sept. 19, 1967.

Difficulties have been encountered in regard to using the devices illustrated in the aforementioned patents. For example, in the tool of McKenna et al., it is necessary to completely unthread clamping bolt in order to remove the replaceable cutter from its seat upon the shank. In the Lovendahl structure, the design of the camming and clamping pin or bolt is such that there is substantial tendency to bend the pin either during the clamping operation or while the cutter is being operated in a machine tool in which it is mounted.

In the Kelm structure, the conical portions of the retention pin are eccentric with respect to the axis of said pin and it is difficult to manufacture the same as well as adding to the cost of the structure. In addition, it is essential to wedge both the cutting insert seat as well as the cutting insert against the backing wall of the cutter recess on the shank when clamping the cutting insert to the shank. Still further, the entire structure of the Kelm retention pin is quite complex and in addition to the eccentricity of the conical portion with respect to the axis thereof, the entire pin is relatively expensive to manufacture.

SUMMARY OF THE INVENTION

The principal object of the present invention is to provide a relatively simple cutting tool assembly primarily employing a locking pin capable of wedging and locking a readily clamped and removable cutting tool which is expendable and also capable of having various cutting surfaces and locations thereon placed in operative position while requiring only a very limited amount of rotation of the locking pin to free the cutting tool for removal and indexing, as desired.

A further object of the invention is to provide a seat member which is preferably complementary in shape to the disposable cutting tool and underlies the same while seated against the base surface in a recess and the tool shank, thereby constituting a wear surface so that wear imposed upon the seat member is not transmitted to the base surface of the recess of the tool shank and upon the seat member becoming damaged beyond further use, it is a simple expedient and relatively inexpensive to replace it with a new one, whereby little if any injury is ever imparted to the recess in the tool shank which receives both the disposable cutting tool and the seat member.

A further object of the invention is to securely anchor the seat member against the main surface of the recess of the tool shank so as to prevent relative movement between the two in a direction parallel to the plane of said base surface, such prevention of relative movement being afforded by a bushing extending between the two members and accommodated within complementary recesses formed respectively in the members.

Still another object of the invention is to provide an axial hole in the seat member which is chamfered in its upper end, said hole and chamfer preferably being eccentric to the axis of the seat in the opposite surface of the seat member which accommodates the positioning bushing referred to above, and a locking pin also is provided which is threaded at one end into a hole perpendicular to the plane of said base surface of the recess in said tool shank while the opposite end of the locking pin is complementary in diameter to the hole in said cutting tool for accommodation within said hole, while the intermediate portion of said locking pin is complementary to the chamfer in said hole in said seat member so that, upon threading the locking pin into said hole in the base surface of the recess in said tool shank, the upper end of the locking pin which is within the hole in said cutting tool wedges and locks said cutting tool against said seat member and at least one wall in said recess of said tool shank which is perpendicular to the base surface in said recess and thereby operatively secure the cutting tool to the tool shank until adjustmust or replacement of the cutting tool is desired.

A still further object of the invention is to provide ejection means movable relative to the tool shank and engageable at one end with the cutting tool when the locking pin has released the same for removal or adjustment relative to the tool shank and thereby facilitate such removal of the cutting tool from its seat upon said shank.

Still another object of the invention is to provide seating and positioning means between said seat member and the recess in the tool shank which receives the same, so as to insure predetermined and accurate positioning of said seat member upon the base surface of the recess in said tool shank and thereby prevent the possibility of positioning said seat member inaccurately relative to the tool shank.

Details of the invention and the foregoing objects, as well as other objects thereof, are set forth in the following specification and illustrated in the accompanying drawing comprising a part thereof.

BRIEF DESCRIPTION OF THE DRAWING

FIG. 1 is a side elevation of the exemplary tool holder of conventional type used upon machine tools and supporting a cutting tool embodying the principles of the present invention.

FIG. 2 is a fragmentary elevation of the outer end of the cutting tool shown in FIG. 1 but illustrated on a larger scale to show details of the invention.

FIG. 3 is a front end view of the tool shown in FIG. 2.

FIG. 4 is a fragmentary top plan view of the tool shown in FIGS. 2 and 3.

FIG. 5 is a fragmentary exploded side elevation of the portion of the tool shown in FIG. 2.

FIG. 6 is a top plan view of one embodiment of configuration of the seat member shown in the tool in the preceding figures.

FIG. 7 is a top plan view of one embodiment of disposable cutting tool of the type illustrated in FIGS. 1–5.

FIG. 8 is a view similar to FIG. 2 but illustrating an exemplary ejecting device for the disposable cutting tool element of the tool assembly illustrated in the preceding figure.

DESCRIPTION OF THE PREFERRED EMBODIMENTS

Referring to FIG. 1, a tool holder 10 of conventional type is illustrated to show one embodiment of the manner in which the machine cutting tool comprising the principles of the present invention is used. The tool holder 10 includes a tool post 12 through which a slot 14 extends to accommodate the shank 16 of a machine cutting tool. An appropriate collar 18 surrounds the lower portion of post 12 and abuts the upper surface of tool carriage 20 of conventional type. An elongated threaded screw 22 clamps the shank 16 against collar 18 and thereby secures the machine cutting tool to an appropriate portion of a machine tool, including the many types presently employed in modern machining operations.

The outer end of tool shank 16 is provided with a notch or recess 24 which has a base surface 26 that preferably extends forwardly and downwardly with respect to the axis of the shank 16, as shown in side elevation in FIG. 2. In addition, said base surface also slopes outwardly and downwardly toward one side of the shank 16 as can be seen from the front end view shown in FIG. 3. The recess 24 also is defined by a side wall 28 which is perpendicular to the innermost edge of base surface 26, as seen in FIG. 2, and an additional side wall 30 likewise is perpendicular to the inner side edge of base surface 26 as shown in FIG. 3.

A hole 32 extends perpendicularly from the base surface 26 to the opposite or bottom surface 34 of the tool shank 16. Said hole is preferably substantially central of base surface 26. The lower portion of the hole is threaded and the upper portion 36 of hole 32 is enlarged and cylindrical to comprise a recess for purposes to be described.

In accordance with the preferred principles of the present invention, a seat member 38 is provided which is formed from good quality steel such as tool steel or, if desired, it may be formed from carbide so as to insure long usage without appreciable wear or deformation. In plan view, it has a shape complementary to that of base surface 26. From FIG. 6, wherein the exemplary seat member 38 is shown in plan view, it will be seen that the corners thereof are rounded, except that one corner 40 is relieved, for purposes to be described. The seat member 38 is provided with a hole 42 which extends downward from the upper surface thereof and the upper end of said hole is provided with a chamfer 44 for purposes to be described.

Extending inward from the lower surface of seat member 38 is a recess 46 which is of the same diameter as the upper portion 36 of hole 32 and is complementary thereto and also is in axial alignment therewith when the seat member 38 is positioned operatively upon the base surface 26. From FIG. 6 however, it will be seen that the axis of hole 42 is eccentric relative to recess 46 by the axes of the two being offset from each other a limited amount, such as of the order of between .020 inch and .025 inch. Such dimension range is merely exemplary however and depends upon the type and size of the tool to which the invention is applied.

A disposable or expendable cutting tool 48 is shown in the various figures and particularly, in plan view, in FIG. 7. Said tool is of the type, for example, formed from appropriate carbide and of standard construction now widely used in machining operations. It will be seen from FIG. 7 that the tool is approximately of the same shape as the seat member 38 except that one corner thereof is provided with a relief such as in the corner 40 of the seat member 38. Accordingly, the cutting tool 48 is provided with a number of similar corners 50 and opposite ends of said corners each comprise a different cutting surface or portion. Thus, for example, the square cutter 48 actually has eight cutting corners which successively can be placed in operative position with respect to the tool shank 16 after each preceding corner has become dull beyond further use. The cutting tool 48 also is provided with a central cylindrical hole 52 by which the same is positioned and locked in operative position directly upon the upper surface of seat holder 38 by means described hereinafter.

From the various figures of the drawing, it will be seen that the base surface 26 of positioning recess 24, seat member 38 and cutting tool 48, all of which are substantially complementary in shape in plan view, have been shown as being square. This shape has been selected primarily for ease of illustrating the present invention. Said shape is not to be regarded as restrictive however, since the invention may be applied to cutting tools having other geometric shapes including, without restriction thereto, triangles, diamonds, hexigons, circles, and many others, depending upon the cutting surface desired or required to be used in regard to any particular machining operation. Rather than the invention being restricted to any particular shape of the cutting tool, it is directed to clamping and locking means for such tool and especially the mechanism by which the cutting tool readily is clamped as well as being released for shifting a new cutting point, section or surface to operative position, or replacing the cutting tool with a new one.

The actual locking and clamping member of the present invention primarily comprises a locking pin 54 which is best shown in side elevation in FIG. 5 which comprises an exploded arrangement of all elements and members constituting the tool holder embodying the principles of the present invention. Said locking pin has a lower threaded end 56. The threads thereof are complementary to the threads in the lower portion of hole 32 but engage the same only loosely for purposes to be described. For practical purposes, the threads 56 may have what is known in the tool industry as about a 40% or 50% fit with the threads in the lower portion of hole 32. Thus, the axis of locking pin 54 may be varied through a small angle with respect to the axis of hole 32, for example, when said pin extends through the holes 42 of seat member 38 and hole 52 of cutting tool 48.

As will be best seen from FIGS. 2 and 3, the length of locking pin 54 is such that the upper end 58 thereof is received within the hole 52 of cutting tool 48. The side walls of said upper end 58 of pin 54 are somewhat bulbous or partly spherical in shape so as to insure firm contact of at least a line on the exterior of upper end 58 of said pin with the complementary cylindrical surface of hole 52 to effect the clamping thereof in operative position in the manner described in detail hereinafter. The diameter of upper end 58 of the pin 54 is larger than hole 42 in seat member 38, whereby only cutting tool 48 is removable from end 58 when the tool 48 is unclamped.

It also will be seen, from FIG. 5 in particular, that intermediately between the opposite ends of pin 54, it is provided with a frusto-conical portion 60 which is relatively complementary to the chamfer 48 in the upper end of hole 42 of seat member 38. Between said frusto-conical portion 60 and the threaded end 56, the pin 54 is reduced in diameter so as readily to permit lateral movement of the axis of the pin 54 relative to the various holes in the elements of the device through which said pin extends. The upper end of pin 54, as well as the lower end thereof, if desired, is provided with a wrench-receiving socket 62, for use with an Allen wrench for example, by which the pin 54 is rotated.

Positioning means for seat members 38 also are provided in the form of an annular bushing 64 which is cylindrical and complementary in shape to the opposing recess 46 and upper portion 36 of hole 32. The length of bushing 64 preferably is slightly less than the total axial dimension of the recess 46 and upper portion 36 of hole 32 but the outer diameter of said bushing preferably is only very slightly less than the inner diameter of the recesses within which the same is received so as accurately to position seat member 38 relative to recess 24 and especially base surface 26 thereof upon which it firmly rests. One of the principal functions of seat member 38 is to serve as a wear member and thus spare or protect the base surface 26 from appreciable wear. It also forms a precisely made seat for the very accurately formed cutting tool 48. In addition, depending particularly upon the material from which the seat member 38 is formed, it has a higher ability to dissipate heat than the tool steel from which the shank 16 normally is made. Thus, while it primarily provides a replaceable supporting surface of the cutting tool, it has the foregoing additional attributes.

In view of the fact that the hole 42 in seat member 38 is off-centered with respect to the recess 46 in the undersurface thereof, it is essential that the seat member 38 be positioned upon base surface 26 in a predetermined manner which is fool-proof. Accordingly, the relieved corner 40 thereof normally is placed in the corner of recess 24 where the sidewalls 28 and 30 meet. To insure this, a positioning pin 66, shown in FIGS. 2, 4 and 5, projects upwardly in said corner. The positioning pin 66 is relatively short and is driven into a hole 68 which extends inward from the bottom surface 34 of tool shank 16. The diameter of pin 66 and the location thereof with respect to the corner of recess 24 referred to is such that the relieved corner 40 of seat member 38 will readily accept said pin but none of the other corners of the seat member will accommodate the same.

The eccentric or off-centered location of the axis of hole 42 with respect to the axis of recess 46 in seat member 38 is for purposes of rendering the wedging and locking action of portion 60 of locking pin 54 as efficient as possible, coupled with predetermined direction for the clamping of cutting tool 48. Such wedging and clamping of the cutting tool 48 against at least one and preferably both of the sidewalls 28 and 30 of recess 24 is accomplished by threading of the locking pin 54 into the threaded portion of hole 32. When the portion 60 of pin 54 engages the chamfer 44 in the upper end of the hole 42 of seat member 38, a limited amount of additional threading of the pin 54 into the threaded hole 32 will cause the upper end 58 of pin 54 to push or wedge the side surfaces of the cutting tool 48 which are adjacent the sidewalls 28 and 30 into firm gripping engagement therewith and thus prevent dislodgment of the cutting tool 48 from its operative position upon the upper surface of seat member 38.

By displacing the axis of recess 46 relative to that of hole 42 along a line extending diagonally across seat member 38 from the relieved corner 40 to the opposite corner, as well as having the positioning pin 66 at the intersection of sidewalls 28 and 30, locking action of pin 54 will insure firm abutting of the adjacent sides of cutting tool 48 against said sidewalls and thus assure firm and accurate positioning of said tool within recess 24.

Such clamping and actual locking of the cutting tool 48 upon the tool shank 16 is accomplished without any portion of the pin 54 overlying the upper surface of the cutting tool 48. Also, if desired, only one perpendicular sidewall may be provided rather than both of the sidewalls 28 and 30. Notwithstanding this however, fully adequate support of the cutting tool is provided by the seat member 38 and the cutting tool will not become dislodged from its seat upon said member 38 during normal operation thereof. Also, by offsetting the axis of hole 42 relative to the axis of recess 46, in the exemplary manner illustrated in FIG. 6, the wedging of said abutting side surfaces of the cutting tool 48 respectively against the sidewalls 28 and 30 of recess 24 is accomplished automatically.

The present invention also provides means for facilitating the removal of the cutting tool 48 from its position upon the seat member 38, particularly when the cutting tool and seat member are substantially of the same shape and dimensions in plan view. Referring to FIG. 7, it will be seen that the positioning pin 66 is tubular as shown in the portion of said figure which is broken away to expose such inner details. An ejection pin 70 extends through the tubular positioning pin 66 and the length thereof is such that the outer end projects a limited distance beyond the bottom surface 34 of the shank 16. The inner end of the ejection pin 70 is provided with a head 72 which is of slightly larger diameter than the positioning pin 66 so as to prevent the accidental removal of the ejection pin 70 from the device.

The upper surface of head 72 engages one corner of the cutting tool 48 as readily can be seen from FIG. 7. Thus, when the locking pin 54 has been rotated to release or unclamp the cutting tool 48, it is only necessary to engage the lower end of ejection pin 70 and push it upwardly, whereby the corner of the cutting tool 48 which is engaged by the head 72 of said pin will push the cutting tool 48 upwardly sufficiently to assist in its removal.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A cutting tool assembly comprising in combination a tool shank having a recess in one end thereof to provide a seat having a base surface which is substantially horizontal in use and including a pair of angularly related wall surfaces extending substantially perpendicularly from said base surface, said base surface having a hole substantially perpendicular thereto extending through the opposite surface of said shank and at least the lower portion thereof being threaded, a disposable cutting tool having an axial cylindrical hole therein, a seat member similar in shape to said cutting tool and adapted to underlie the same to directly support it and rest upon said base surface for support and having an axial hole therein adapted to be aligned initially with the hole in said cutting tool and the upper end thereof being chamfered to provide a wedging surface located immediately below said hole in said cutting tool, complementary recesses formed respectively in the abutting faces of said seat member and base surface of said recess, an annular bushing positioned within and closely fitting within and extending between said recesses and operable to prevent relative lateral movement therebetween in directions parallel to the plane of said base surface of said recess, said chamfered surface in said seat member being eccentric to the axis of said recess therein, and a locking pin threaded at one end for loose engagement with the threaded portion of the hole in said tool shank and a relatively short portion of the opposite end of said pin being complementary in diameter to the hole in said cutting tool and received therein and a portion of said pin immediately adjacent said short portion thereof being complementary in shape to and engageable with said chamfer of the hole of said seat member to effect a lateral wedging of the cutting tool against said wall surfaces of said recess of said tool shank caused by the eccentric position of said chamfer relative to the axis of said recess in said seat member when said locking pin is threaded into said hole in said tool shank, thereby to clamp said cutting tool securely to said seat and firmly abut related sides thereof against said walls of said recess in said tool shank.

2. The cutting tool according to claim 1 in which said axial hole in said seat member is of smaller diameter than that of said opposite end of said locking pin which is received in said hole in said cutting tool, whereby when said cutting tool is released from the seat means therefor said seat member cannot be accidentally removed from said locking pin.

3. The cutting tool assembly according to claim 1 in which said chamfered surface of said seat member is offset from the axis of said recess therein toward the apex of said angularly related wall surfaces of said recess in said tool shank to provide said eccentric relation of said chamfered surface and recess in said seat member and thereby provide secure clamping of said cutting tool to said seat in said tool shank.

4. The cutting tool assembly according to claim 3 further including keying means on said seat member and seat in said tool shank cooperable to insure fool-proof positioning of said seat member within said seat with said eccentric position of said chamfered surface disposed as aforesaid.

5. The cutting tool assembly according to claim 4 in which said keying means comprises a relief in the corner of said seat member disposed within the apex of said wall surfaces of said seat in said tool shank, and a pin positioned within said apex for registry with said relief in said seat member.

6. The cutting tool assembly according to claim 5 in which said pin is movable substantially perpendicularly to said base surface of said recess in said tool shank and operable when said locking pin has been released from locking engagement with said cutting tool to be projected against a corner of said cutting tool to dislodge it from engagement with said seat member and locking pin.

References Cited

UNITED STATES PATENTS

| | | | |
|---|---|---|---|
| 3,310,859 | 3/1967 | Dremond et al. | 29—96 |
| 3,341,920 | 9/1967 | Kelm | 29—96 |
| 3,341,921 | 9/1967 | Weller et al. | 29—96 |
| 3,341,923 | 9/1967 | Kelm | 29—96 |
| 3,526,025 | 9/1970 | Sletten | 29—95.1 |

HARRISON L. HINSON, Primary Examiner